United States Patent
Harter, Jr. et al.

(10) Patent No.: US 6,402,321 B1
(45) Date of Patent: Jun. 11, 2002

(54) HEAD UP DISPLAY WITH MODULAR PROJECTION SYSTEM

(75) Inventors: Joseph Edward Harter, Jr., Kokomo; Marlin D. Meredith, Arcadia, both of IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/431,345

(22) Filed: Oct. 29, 1999

(51) Int. Cl.[7] .......................... G03B 21/00; G03H 1/00; G09G 5/00; G02B 27/14
(52) U.S. Cl. .............................. 353/14; 353/10; 353/12; 359/13; 359/630; 359/631; 345/7
(58) Field of Search ................................ 353/10, 11, 12, 353/13, 14, 69; 340/980; 350/13, 630, 631; 345/1, 7, 8, 9

(56) References Cited

U.S. PATENT DOCUMENTS

| | | | | |
|---|---|---|---|---|
| 4,711,544 A | * | 12/1987 | Iino et al. ..................... 353/14 |
| 4,886,328 A | * | 12/1989 | Iino ............................ 340/980 |
| 4,961,625 A | | 10/1990 | Wood et al. ................. 359/630 |
| 5,013,135 A | * | 5/1991 | Yamamura ................... 350/174 |

* cited by examiner

Primary Examiner—Russell Adams
Assistant Examiner—Melissa J. Koval
(74) Attorney, Agent, or Firm—Jimmy L. Funke

(57) ABSTRACT

A head up display system is disclosed that includes a housing, an aspheric reflector, and a modular projection unit. The modular projection unit includes a backlight, a spherical reflector, an infrared mirror, one or more display devices, and cooling apparatus. The backlight has a spherical reflector with inner and outer reflective spherical surfaces and a central opening that is used to recycle light and provide a desired aperture shape. The one or more display devices may be liquid crystal displays, such as active matrix liquid crystal displays. Exemplary cooling apparatus includes an air inlet, a fan and an air outlet that forces air past heat generating components of the projection unit.

12 Claims, 4 Drawing Sheets

HEAD UP DISPLAY WITH MODULAR PROJECTION SYSTEM

TECHNICAL FIELD

The present invention relates to head up display systems and projection units used therein, for use in vehicular applications, and the like.

BACKGROUND OF THE INVENTION

The assignee of the present invention manufactures head up display systems for use in vehicles. Heretofore, head up display systems have been specifically designed for use in each respective vehicle, with optics custom designed for the specific application. It would be desirable to have a head up display system that is modular and permits different optical designs and display devices without changing the complete system. It would also be desirable to have a head up display system that that has a improved projection unit incorporating improved backlight and display devices, and incorporates cooling apparatus.

SUMMARY OF THE INVENTION

The present invention provides for a head up display system that may be advantageously used in automotive and other vehicular applications. The present system has a projection unit that is a subassembly by itself. The projection unit comprises a backlight, a display, and cooling apparatus. If required, electronics, mirrors, reflectors, polarizers, diffusers, and the like, may also be enclosed within the projection unit. Different display types require different components. A single image source or multiple image sources may be used within the projection unit. A reduced-to-practice embodiment of the head up display system was built using dual image sources.

An exemplary head up display system comprises a housing, an aspheric reflector, and a modular projection unit. The modular projection unit comprises one or more image sources including a backlight, a spherical reflector, an infrared mirror, a display device, and cooling apparatus for cooling the projection unit.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
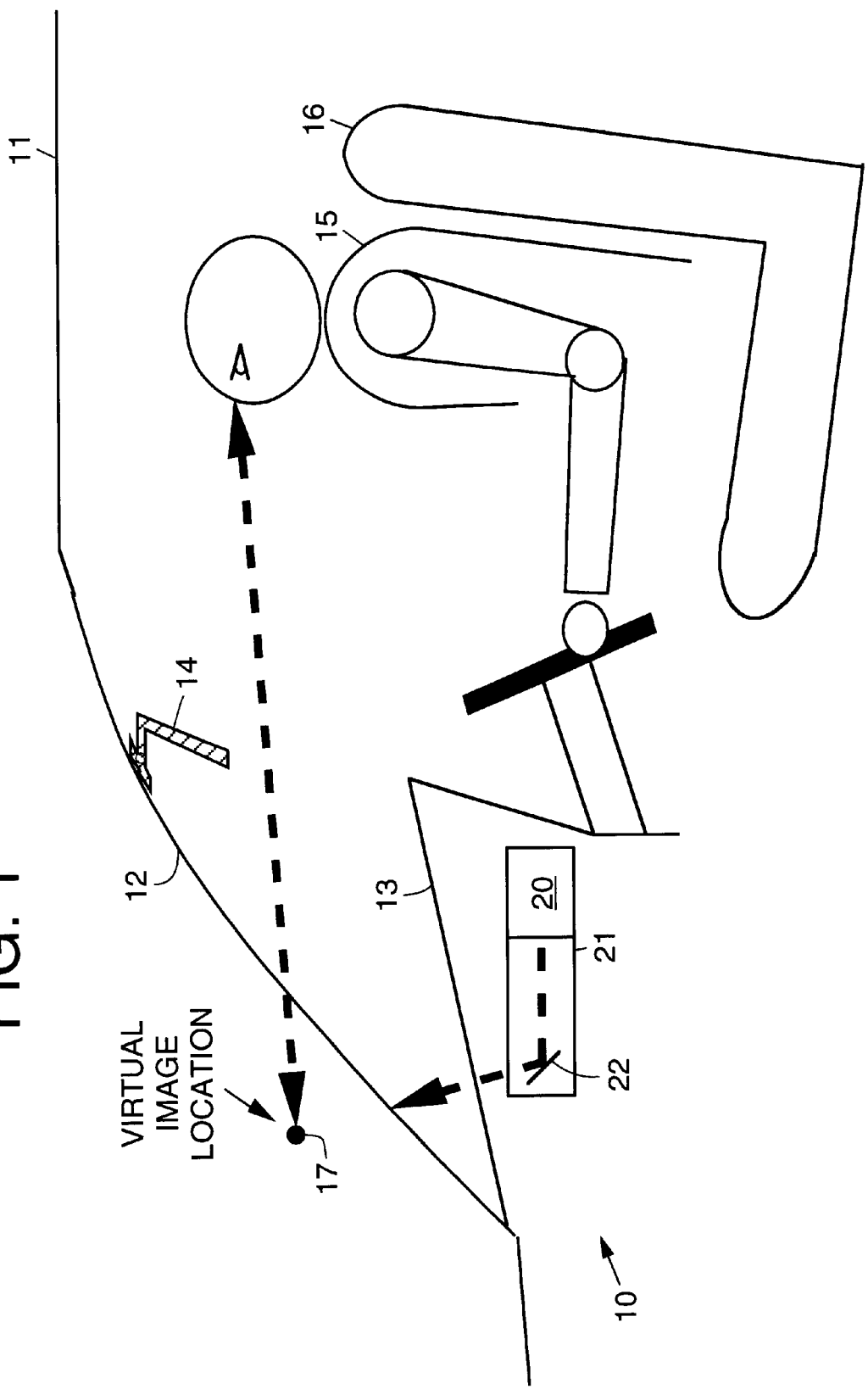
FIG. 1 illustrates an exemplary embodiment of a head up display system in accordance with the principles of the present invention disposed in a vehicle.

Referring to the drawing figures, FIG. 1 illustrates an exemplary embodiment of a head up display system 10 in accordance with the principles of the present invention disposed in a vehicle 11. FIG. 1 shows a vehicle 11 having a passenger compartment with a vehicle operator 15 occupying a seat 16 in a position to operate the vehicle 11. The vehicle 11 has a windshield 12, a dashboard 13 and a rear view mirror 14. The head up display system 10 is disposed beneath the dashboard 13.

The exemplary head up display system 10 comprises a projection unit 20 that is disposed within a housing 21, which may be made of plastic. for example. An aspheric reflector 22, or aspheric mirror 22, is disposed in the housing 21 and is oriented to reflect one more images output by the projection unit 20 onto the windshield 12 of the vehicle 11. Exemplary aspheric reflectors 22 that may be adapted for use in the head up display system 10 are disclosed in U.S. Pat. No. 4,961,625 issued Oct. 9, 1990, for example.

One or more virtual images 17 are formed in front of the windshield 12 which are viewed by the vehicle operator 15. In a typical vehicle application, images may be projected that include graphic and information displays, such as gauges, speedometer and tachometer data, clock data, temperature data, and direction information derived from a locating system, for example. Other data that may be projected includes multimedia data and images, night vision infrared images, navigation data, cell phone data, E-mail data, and radio data, for example.

Figure 2:
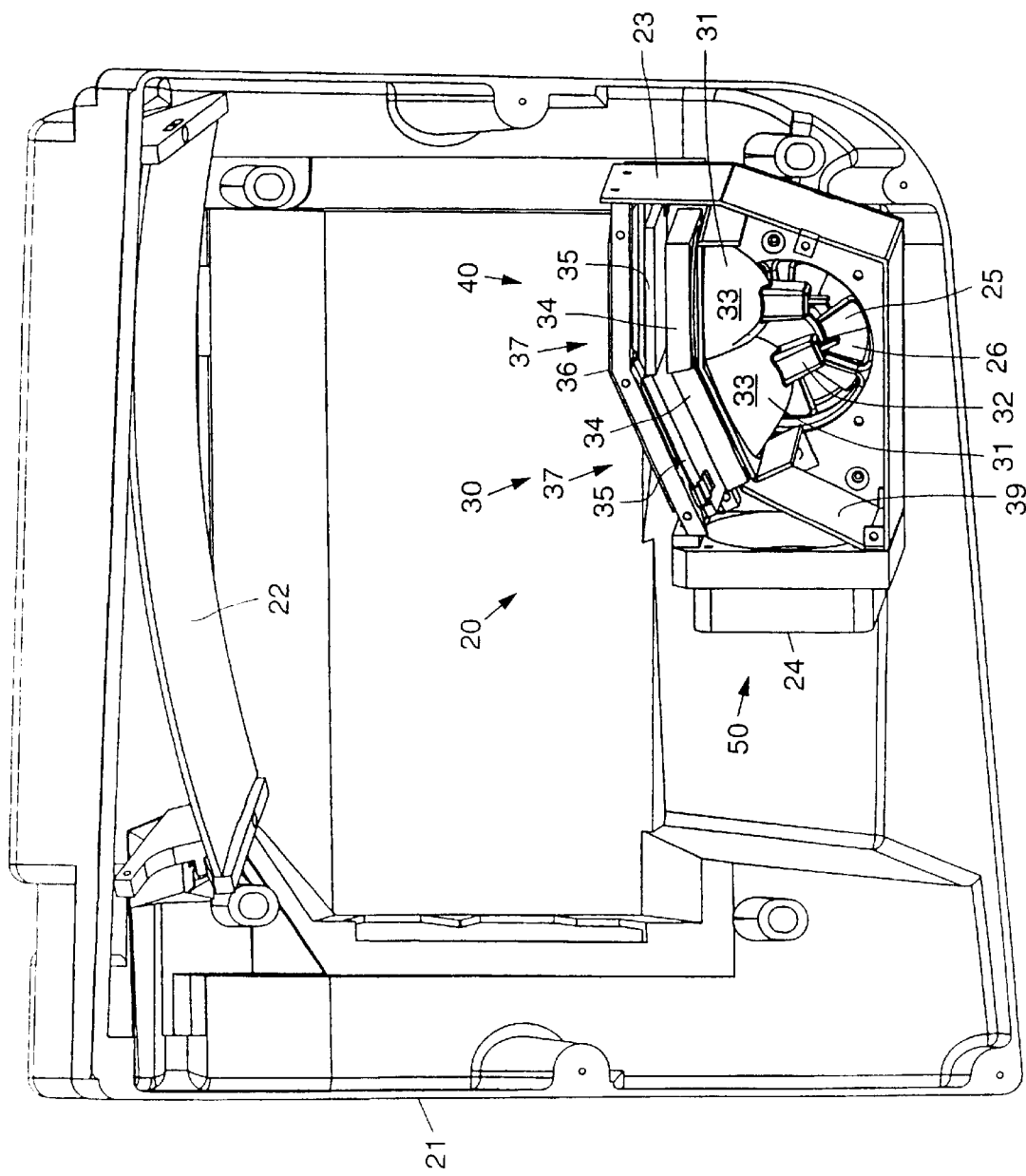
FIG. 2 is a top perspective view of the exemplary head up display system.

FIG. 2 is a top perspective view of the exemplary embodiment of the head up display system 10. FIG. 2 shows details of the housing 21 and the relative locations of the projection unit 20 and aspheric reflector 22.

The projection unit 20 comprises a housing 23 and cooling apparatus 50. The cooling apparatus 50 comprises an air inlet 24 disposed on one side of the housing 23, and a fan 25 and air outlet 26 secured to the bottom of the housing 23. The cooling apparatus 50 may comprise an air duct 39 that forces air past heat generating components of the projection unit 20. In the exemplary embodiment of the projection unit 20, dual image sources 30 are disposed in the housing 23.

Each image source 30 comprises a backlight 40 including a lamp 31 having a lamp housing 32, a bulb 38 (FIG. 8) and a reflector 33. A spherical reflector 34 is disposed adjacent the output of the lamp 31. The spherical reflector 34 is used to recycle light and form a rectangular or square aperture, for example. Details of the spherical reflector 34 are shown with reference to FIGS. 5–7.

An infrared (IR) mirror 35 is disposed in front of the spherical reflector 34. A display holder 36 is disposed in front of the infrared mirror 35 and holds one or more display devices 37, such as liquid crystal displays 37. The display devices 37 are preferably active matrix liquid crystal displays (AMLCD) 37. In the dual image source embodiment of the projection unit 20, the display holder 36 houses two active matrix liquid crystal displays 37. The shape of the aperture formed by the spherical reflector 34 is a function of the shape of the display device 37.

Figure 3:
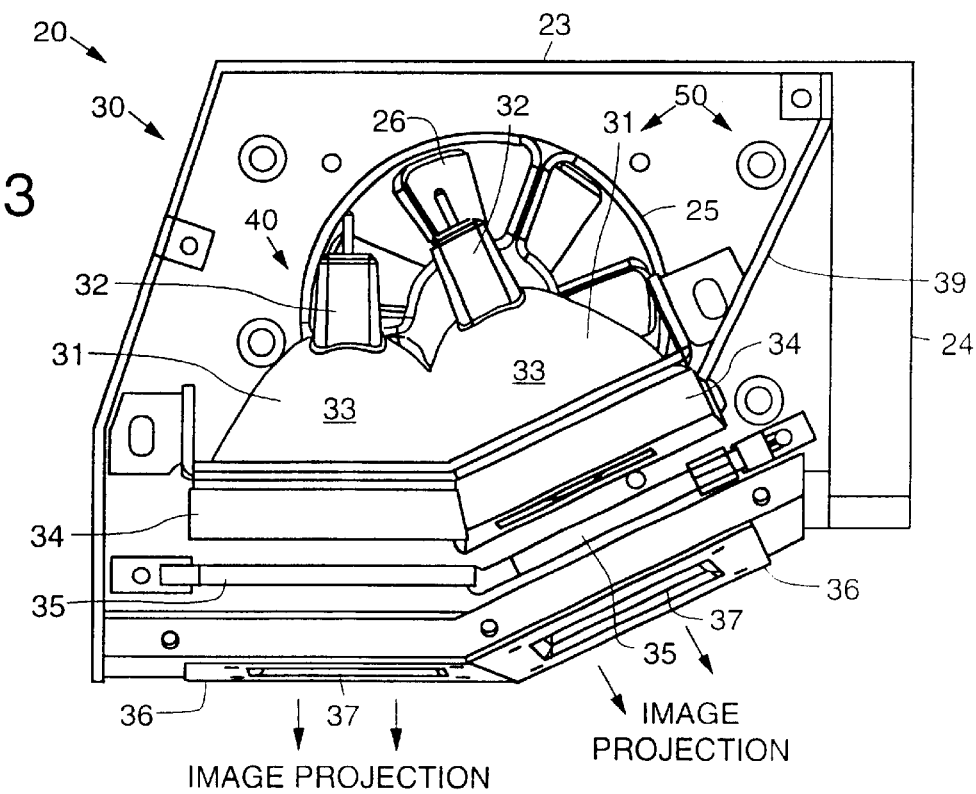
FIG. 3 illustrates details of a projection unit used in the head up display system shown in FIG. 2.
Figure 4:
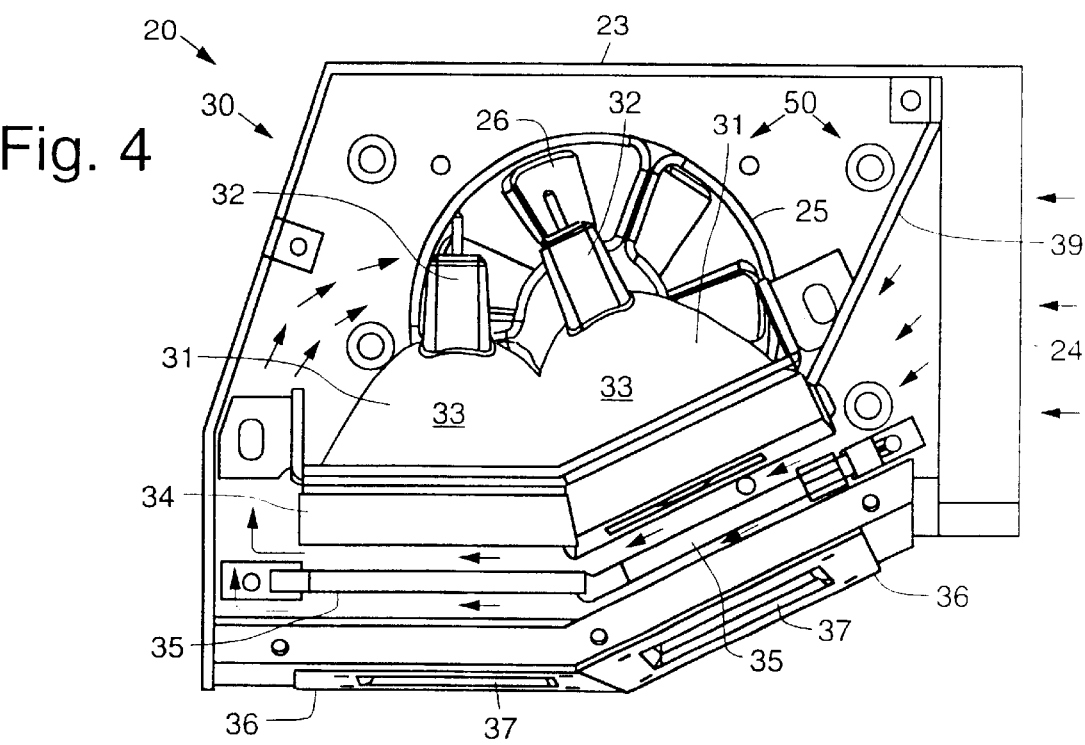
FIG. 4 illustrates cooling of the projection unit shown in FIG. 3.

FIG. 3 illustrates details of the projection unit 20, while FIG. 4 illustrates cooling of the projection unit 20. A projection unit 20 that has been reduced to practice has dimensions as follows. The length of the housing 23 is about 117.94 millimeters while the width of the housing 23 is about 97.17 millimeters. The air inlet 24 projects outward 27.81 millimeters. The thickness of the housing 23 is about 58 millimeters.

Figure 5:
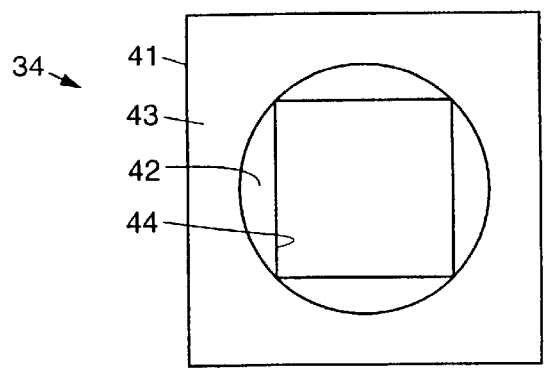
FIGS. 5–7 illustrate front, cross sectional, and rear views of a spherical reflector used in the projection unit shown in FIG. 3.
Figure 6:
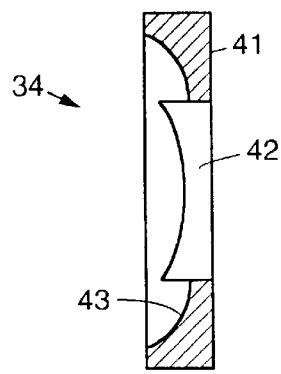
Figure 7:
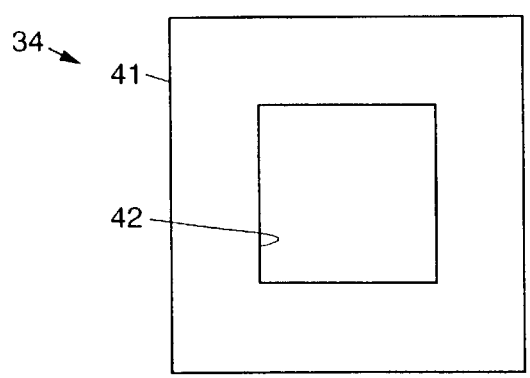

Operation of the projection unit 20 will be discussed with reference to FIGS. 3 and 4. The respective lamp 31 of each image source 30 provides light that is imaged onto its spherical reflector 34. FIGS. 5–7 illustrate front, cross sectional, and rear views of an exemplary spherical reflector 34. As is shown in FIGS. 5–7, the spherical reflector 34 comprises a reflective metal member 41, such as polished aluminum, for example, and has inner and outer reflective spherical surfaces 42, 43 and a square central opening 44 formed therein.

The light output from the lamp 31 is projected through the central opening 44, through the infrared mirror 35 and liquid crystal display 37 off the aspheric mirror 22 and onto the windshield 12 of the vehicle 11. The light that does not pass through the central opening 44 is reflected backward by the inner and outer reflective spherical surfaces 42, 43 to the reflector 33 which in turn reflects the light through the central opening 44. As a result, normally wasted light is recycled and is output by the image source 30, which makes the projected image brighter.

The light passing through the central opening 44 is incident upon the infrared mirror 35 which allows visible light to pass therethrough but reflects infrared light back toward the lamp 31. The infrared mirror 35 thus prevents heat from passing forward into the active matrix liquid crystal display 37.

However, because the heat is reflected, it must be removed from the projection unit 20. This is illustrated in FIG. 4. The air flow is illustrated in FIG. 4 by the arrows in the interior of the housing 23. As is shown in FIG. 4, the fan 25 causes ambient air to flow into the housing [23 through the air inlet 24 which is forced between the spherical reflector 34 and the infrared mirror 35, and between the infrared mirror 35 and the liquid crystal display 37 of each image source 30 by the air duct 39. The heated air is drawn out of the housing 23 by the fan 25 through the air outlet 26.

Figure 8:
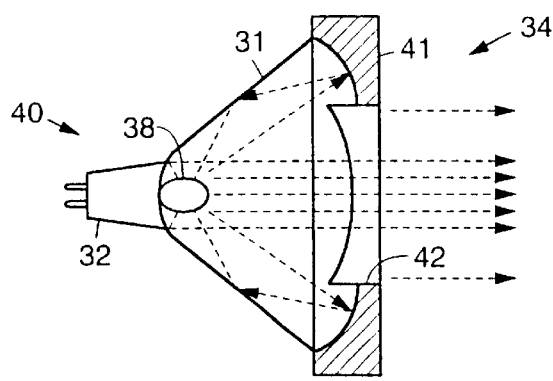
FIG. 8 illustrates a cross sectional view of a lamp and spherical reflector subassembly used in the projection unit shown in FIG. 3.

Referring to FIG. 8, it illustrates a cross sectional view showing the lamp 31 attached to the spherical reflector 34. FIG. 8 illustrates how the light output from the bulb 38 it projected through the central opening 42 and is also reflected by the inner and outer reflective spherical surfaces 42, 43 back to the reflector 33 and then through the central opening 42. This is illustrated by the dashed lines in FIG. 8. As a result, very little, if any, light is wasted.

One advantage of the present is that it allows the head up display system 10 to have different optical designs and display devices 37 without changing the complete system. By way of example, if a new vehicle line requires a head up display system 10, a new set of optics and projection unit 20 are required. The optics and projection unit 20 can be designed to the existing housing 21 and then assembled. This saves on design time and cost. Although active matrix liquid crystal display devices may be used in the present invention at the current time, as new display technologies become available, they may be adapted for use in the projection unit 20 as well. The projection unit 20 may thus be used as a building block for future head up display applications.

Thus, improved head up display systems and projection units used therein have been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A head up display system for use in a vehicle having a windshield, a dashboard, and wherein the head up display system is disposed beneath the dashboard, the system comprising:
    (1) a housing;
    (2) an aspheric reflector disposed within the housing; and
    (3) a projection unit comprising:
        one or more image sources comprising:
            a backlight;
            a spherical reflector disposed adjacent an output of the backlight;
            an infrared mirror disposed adjacent an output of the spherical reflector;
            a display device disposed adjacent an output of the infrared mirror; and
            cooling apparatus for cooling the projection unit.

2. The system recited in claim 1 wherein the projection unit further comprises an air duct that is used to convey air past heat generating components of the projection unit.

3. The system recited in claim 1 wherein the backlight comprises a lamp, a bulb, and a reflector.

4. The system recited in claim 1 wherein the display device comprises a liquid crystal display.

5. The system recited in claim 1 wherein the display device comprises an active matrix liquid crystal display.

6. The system recited in claim 1 wherein the cooling apparatus comprises an air inlet, a fan and air outlet that forces air past heat generating components of the projection unit.

7. A projection unit for use in a head up display system, comprising:
    a housing;
    one or more image sources disposed in the housing, which one or more image Sources each comprise a backlight, a spherical reflector disposed adjacent an output of the backlight, an infrared mirror disposed adjacent an output of the spherical reflector, and a display device disposed adjacent an output of the infrared mirror; and
    cooling apparatus disposed in the housing for cooling the projection unit.

8. The projection unit recited in claim 7 further comprising an air duct that is used to convey air past heat generating components of the projection unit.

9. The projection unit recited in claim 7 wherein the backlight comprises a lamp, a bulb, and a reflector.

10. The projection unit recited in claim 7 wherein the display device comprises a liquid crystal display.

11. The projection unit recited in claim 7 wherein the display device comprises an active matrix liquid crystal display.

12. The projection unit recited in claim 7 wherein the cooling apparatus comprises an air inlet, a fan and air outlet that forces air past heat generating components of the projection unit.

* * * * *